United States Patent [19]
Standiford et al.

[11] Patent Number: 5,694,274
[45] Date of Patent: Dec. 2, 1997

[54] AZIMUTH ANGLE ADJUSTMENT FOR A MAGNETIC HEAD

[75] Inventors: Gregory A. Standiford; Charles L. Hunter, both of Loveland, Colo.

[73] Assignee: Hewlett-Packard Company, Palo Alto, Calif.

[21] Appl. No.: 785,122

[22] Filed: Jan. 21, 1997

Related U.S. Application Data

[63] Continuation of Ser. No. 414,988, Mar. 31, 1995, abandoned.

[51] Int. Cl.$^6$ .............................. G11B 5/56; G11B 21/24
[52] U.S. Cl. .................................................. 360/109
[58] Field of Search ........................... 360/104, 105, 360/106, 109, 77.12, 77.13, 78.02; 74/89.15

[56] References Cited

U.S. PATENT DOCUMENTS

| | | | |
|---|---|---|---|
| 4,052,745 | 10/1977 | Nakamichi | 360/109 |
| 4,268,881 | 5/1981 | Saito | 360/109 |
| 4,329,723 | 5/1982 | Schoenmakers | 360/109 |
| 4,683,507 | 7/1987 | Roberts | 360/104 |
| 4,833,558 | 5/1989 | Baheri | 360/106 |
| 5,210,664 | 5/1993 | Perona | 360/93 |

FOREIGN PATENT DOCUMENTS

| | | | |
|---|---|---|---|
| 60-258722 | 12/1985 | Japan | 360/109 |
| 61-222016 | 10/1986 | Japan | 360/109 |
| 298944 | 5/1954 | Switzerland | 360/109 |
| 490171 | 1/1976 | U.S.S.R. | 360/109 |
| 627525 | 8/1978 | U.S.S.R. | 360/109 |
| 845171 | 7/1981 | U.S.S.R. | 360/109 |

OTHER PUBLICATIONS

Japan Abstracts, JP 4-69810, Hitachi Ltd, Ikeda et al, Mar. 5, 1992.

Japan Abstracts, JP 55-125531, Toshikazu Katou, Sep. 27, 1980.

*Primary Examiner*—Robert S. Tupper
*Assistant Examiner*—David L. Ometz
*Attorney, Agent, or Firm*—Augustus W. Winfield

[57] ABSTRACT

A drive chassis for magnetic tapes, the chassis having adjustable azimuth for a magnetic head. The magnetic head is mounted onto a plate. The plate has one end forming a hinge surface. The hinge surface is forced into contact with a stationary hinge surface on the chassis. A second end of the plate is moveable, permitting the plate to rotate around the hinge surfaces, thereby rotating the magnetic head. A spring in contact with the second end of the plate forces the hinge surface of the plate against the hinge surface on the chassis. In a preferred embodiment, the spring is integral with a side wall of the chassis.

2 Claims, 7 Drawing Sheets

5,694,274

AZIMUTH ANGLE ADJUSTMENT FOR A MAGNETIC HEAD

This is a continuation of application Ser. No. 08/414,988 filed on Mar. 31, 95, now abandoned.

FIELD OF INVENTION

This invention relates generally to drive mechanisms for magnetic tapes and more specifically to azimuth angle adjustment of a magnetic head.

BACKGROUND OF THE INVENTION

FIG. 1A illustrates a magnetic head 100 for a data tape drive and a magnetic tape 104 having a longitudinal data track. The tape 104 moves past the head 100 in the direction indicated by arrow 106. The magnetic head 100 has a magnetic gap 102. The gap 102 has a length and width, where for longitudinal recording, length is typically defined in the direction parallel to the direction of tape travel and width is typically defined in the direction transverse to the direction of tape travel. The angle of the centerline of the gap in the direction of gap width relative to the direction of tape movement is called azimuth. For longitudinal recording (as opposed to helical scan recording) the head is stationary and azimuth is the angle of the centerline of the gap in the direction of gap width relative to the centerline of the tape. In FIG. 1A, the centerline of gap 102 in the direction of gap width is precisely perpendicular to the centerline of the tape 104.

A magnetic field across the length of gap 102 (parallel to the tape centerline) can have one of two polarities. The head 102 writes data on the magnetic tape 104 by first generating a magnetic field across gap 102 with one polarity and then rapidly switching the magnetic field across gap 102 to the opposite polarity. As a result, a magnetic domain is written on tape 104 with one polarity (for example, domain 108 with magnetic polarity arrows pointing in a first direction) followed by a magnetic domain with the opposite polarity (for example, domain 110 with magnetic polarity arrows pointing in a second direction), and there is a narrow abrupt transition 112 between the domains. The gap 102 may be used to read data from the tape 104. There is a magnetic field near tape 104 generated by each magnetic domain. If magnetic domains 108 and 110 are moved past the gap 102, the abrupt change in the magnetic field at transition 112 results in a voltage pulse from the head 100. The amplitude of the voltage pulse is proportional to the rate of change of the magnetic field.

FIG. 1B illustrates a magnetic head 120 with a gap 122 having an azimuth that is not perpendicular to the centerline of the tape 124. As a result, if head 120 writes data on tape 124, a transition 132 between magnetic domains (128 and 130) is not perpendicular to the centerline of the tape. If the tape 124 is moved past gap 122 for reading, the transition 132 aligns with gap 122 resulting in a rapid change in the magnetic field and a voltage pulse from head 120 as described above for head 100 and tape 104. If, however, the tape 124 written by head 122 is then read by head 100, the transition 132 moves past the gap 102 over a relatively long period of time, resulting in a relatively low rate of change of the magnetic field, resulting in a relatively low amplitude voltage pulse.

As illustrated above, for interchange (writing a tape in one drive and reading in another), it is important for the heads of each drive to have identical azimuths. For relatively low bit density (relatively long distance between transitions), heads may be mounted with a fixed azimuth. As bit density increases (distance between transitions decreases), the importance of accurate azimuth increases. For high bit densities, head azimuth may need to be adjustable and may need to be precisely calibrated during manufacturing of a drive mechanism.

The tapes in FIGS. 1A and 1B are depicted as data tapes but head azimuth as illustrated is equally important for analog drives and tape having longitudinal tracks (for example, audio cassette players). For simplicity of illustration, the tapes 104 and 124 in FIGS 1A and 1B are depicted as having a single longitudinal track. Typically, for longitudinal data recording, there are many parallel tracks and tape travel is bidirectional. Typically, for multiple tracks, the head must move transverse to the direction of tape travel to switch from one track to another. Therefore, any azimuth adjustment must also accommodate head movement transverse to the direction of tape travel.

Some existing drives incorporate a pivoting plate design that includes both azimuth and zenith adjustment. These designs contain several parts that add to assembly cost and complexity. Other existing drives have a stressed member hinge design. The use of a stressed member can induce short term and long term dimensional creep into the assembly, reducing the accuracy of the initial adjustment. There is a continuing need for low cost and precise azimuth adjustment for magnetic heads in tape drives.

SUMMARY OF THE INVENTION

The invention provides an azimuth adjustment arrangement having low cost, ease of assembly and stability (adjustment does not change over time). A drive chassis includes a magnetic head. The magnetic head is mounted onto a plate. One end of the plate and a matching surface on the chassis form a hinge. A second end of the plate is moveable, permitting the plate to rotate around the hinge surfaces, thereby rotating the magnetic head. A spring in contact with the second end of the plate forces the hinge surface of the plate against the hinge surface of the chassis. In a preferred embodiment, the spring is integral with a side wall of the chassis.

DETAILED DESCRIPTION OF THE PREFERRED EMBODIMENT OF THE INVENTION

Figure 1A:
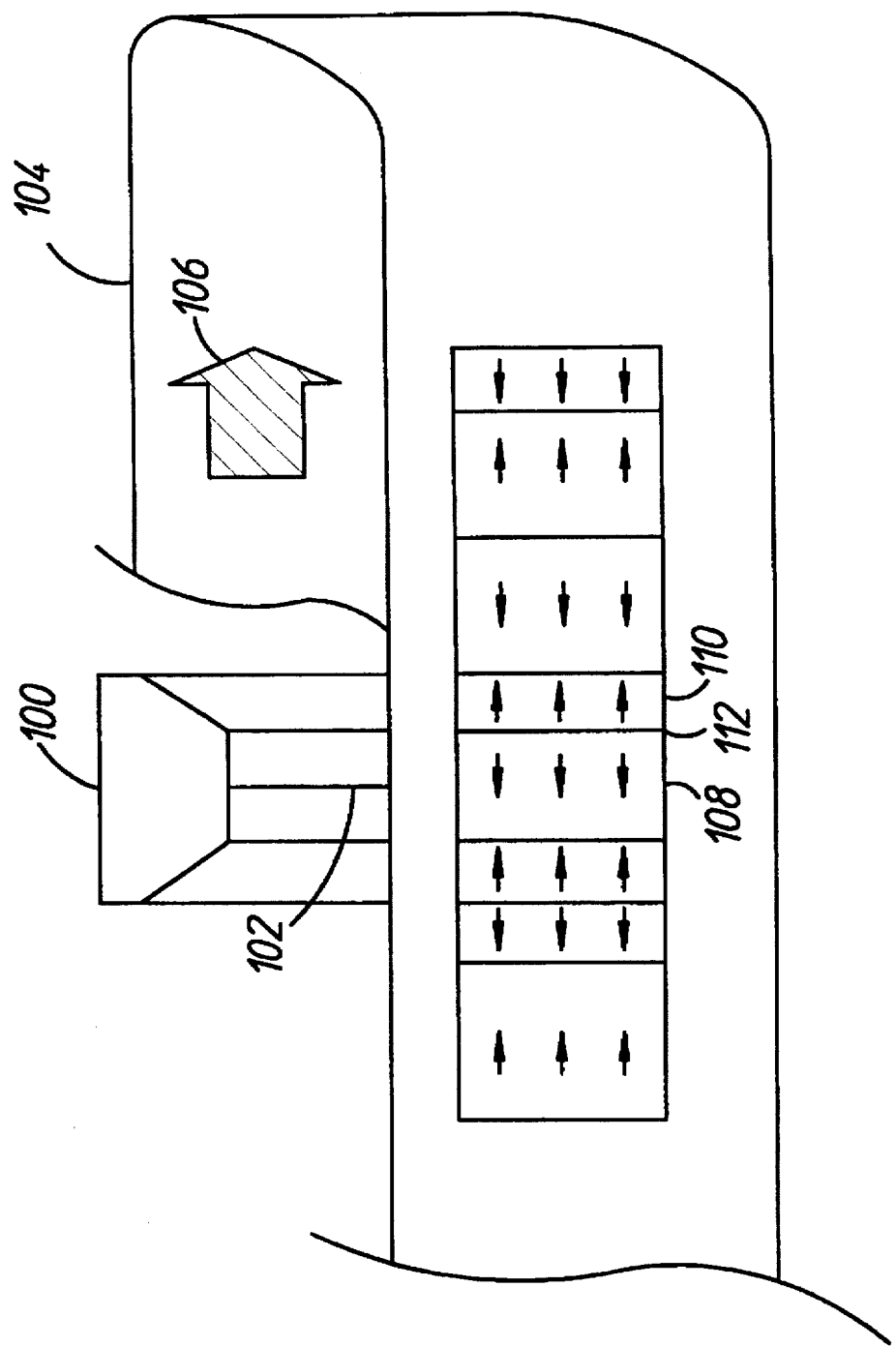
FIG. 1A illustrates a magnetic head and a tape with magnetic domains on the tape.
Figure 1B:
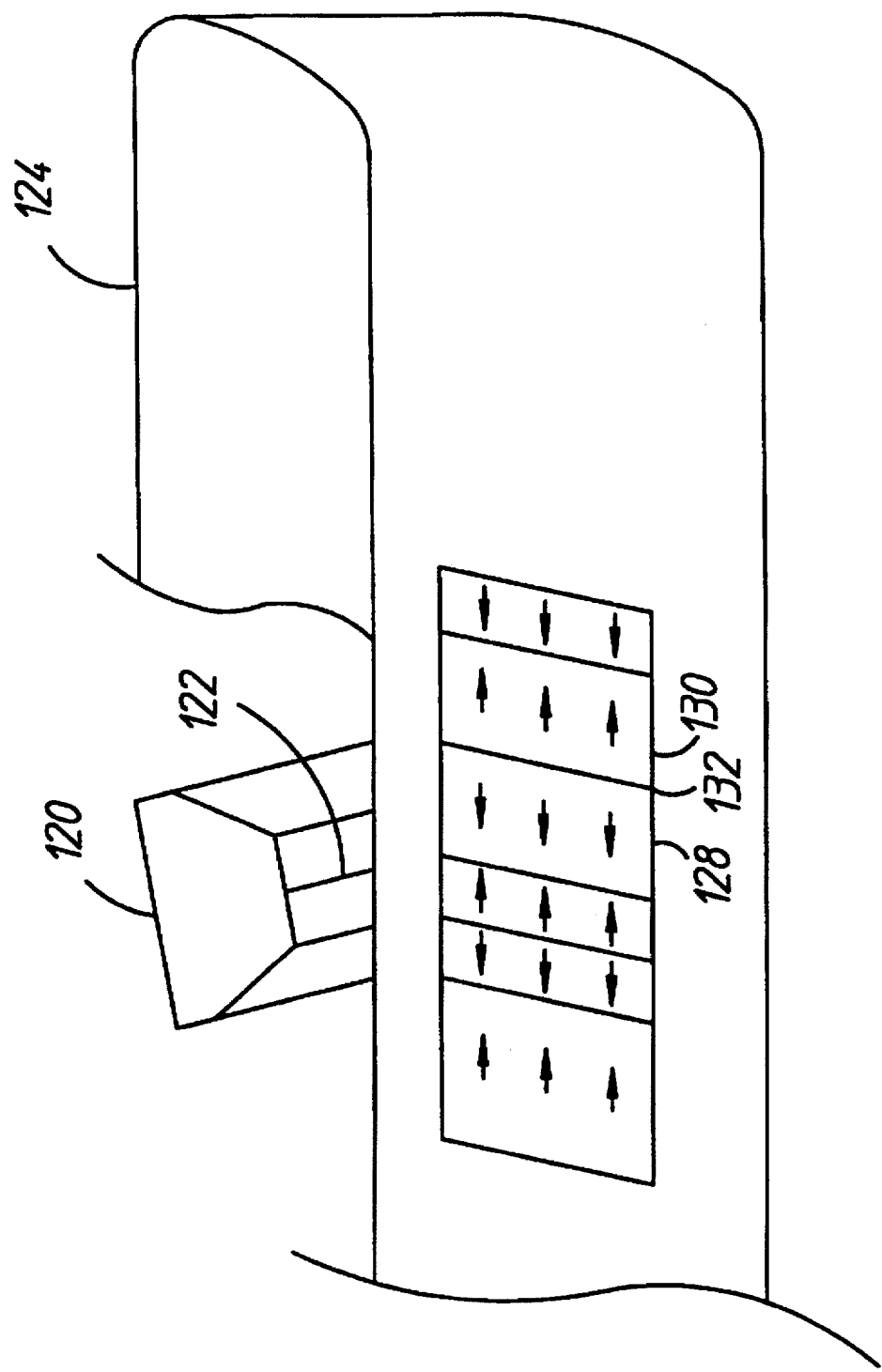
FIG. 1B illustrates a magnetic head having an azimuth different than the magnetic head in FIG. 1A.
Figure 2:
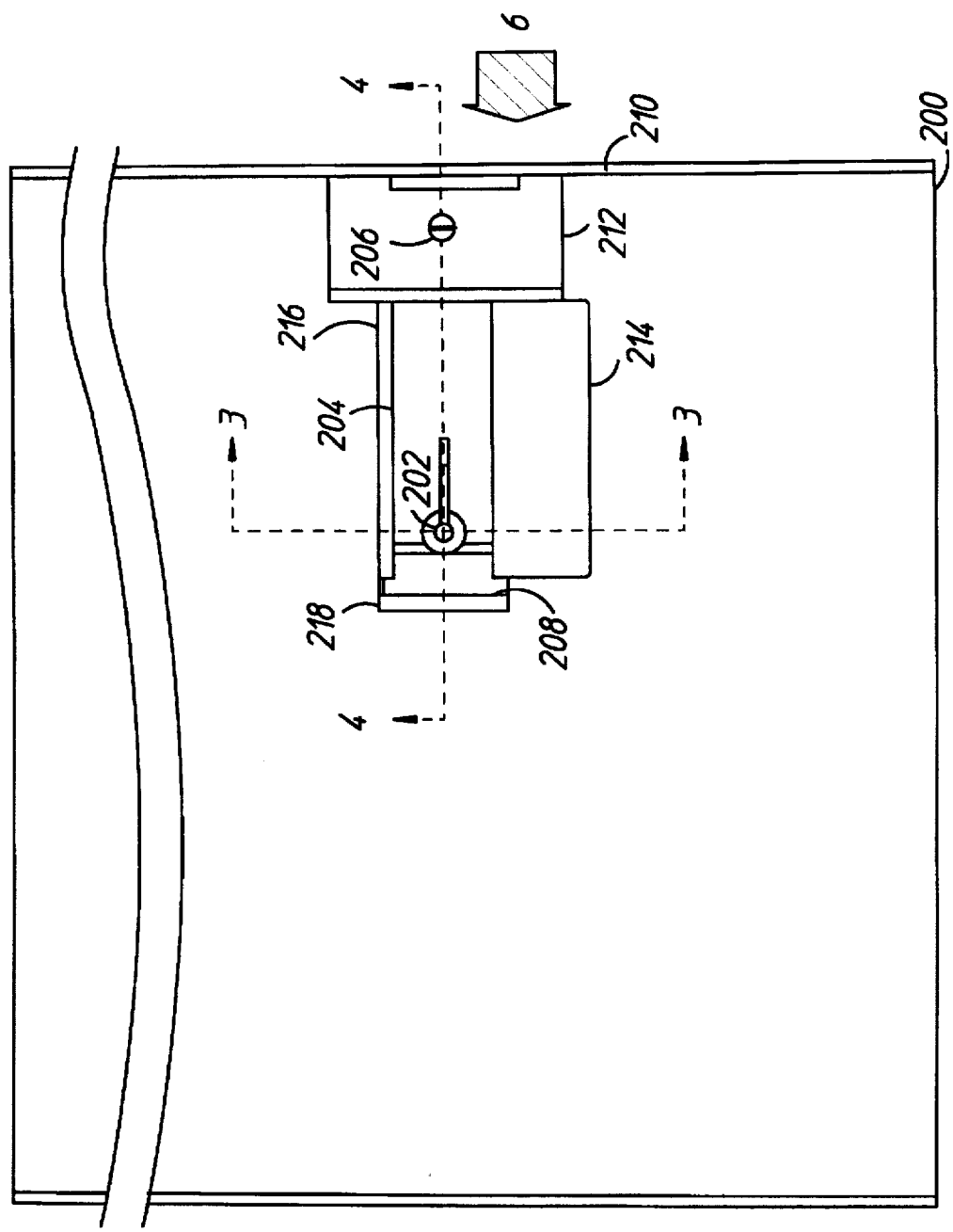
FIG. 2 is a top view of chassis having a plate for head mounting and azimuth adjustment in accordance with the invention.

FIG. 2 is a simplified top view of a tape drive chassis 200 having adjustable head azimuth in accordance with the invention. A magnetic head (not illustrated in FIG. 2) is mounted onto a guide rod 202. Guide rod 202 is mounted onto a plate 204. An adjustment screw 206 moves one end of the plate 204, rotating the opposite end of the plate around a hinge surface 208. A rigid support section 212 of the chassis 200 is also attached to a chassis side wall 210, providing a rigid support for screw 206. Opening 214 provides clearance for the magnetic head to pass through the chassis 200 (see FIG. 3). Opening 216 provides clearance for the plate 204. The chassis 200 or the plate 204 may be manufactured from folded sheet metal, cast metal, plastic or any other suitable structural materials. Preferably, both the chassis 200 and the plate 204 are plastic injection molded using glass filled polycarbonate, engineering/structural grade resin or other structurally similar rigid material.

Figure 3:
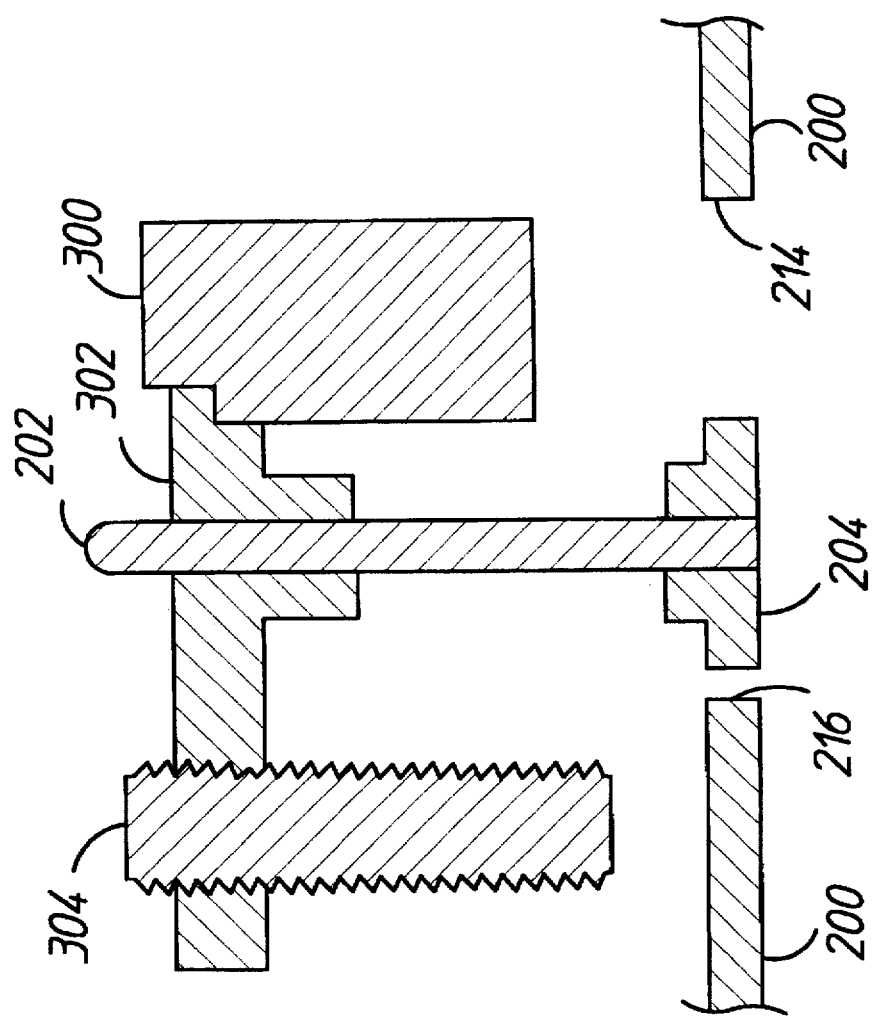
FIG. 3 is a cross section of the chassis of FIG. 2 plus a head and head mounting components not illustrated in FIG. 2.

FIG. 3 is a simplified cross section illustrating a magnetic head 300 attached to a carriage 302. The carriage 302 rides on the guide rod 202 via an opening in the carriage, permitting vertical movement of the carriage and magnetic head. A lead screw 304 drives threads in the carriage (or preferably in a follower nut attached to the carriage). The lead screw 304 may be driven by a motor in any of several conventional ways, for example, by a worm gear arrangement. Note also in FIG. 3 opening 214 providing clearance for the plate 204 and also permitting the bottom of the head 300 to protrude through the chassis.

Figure 4:
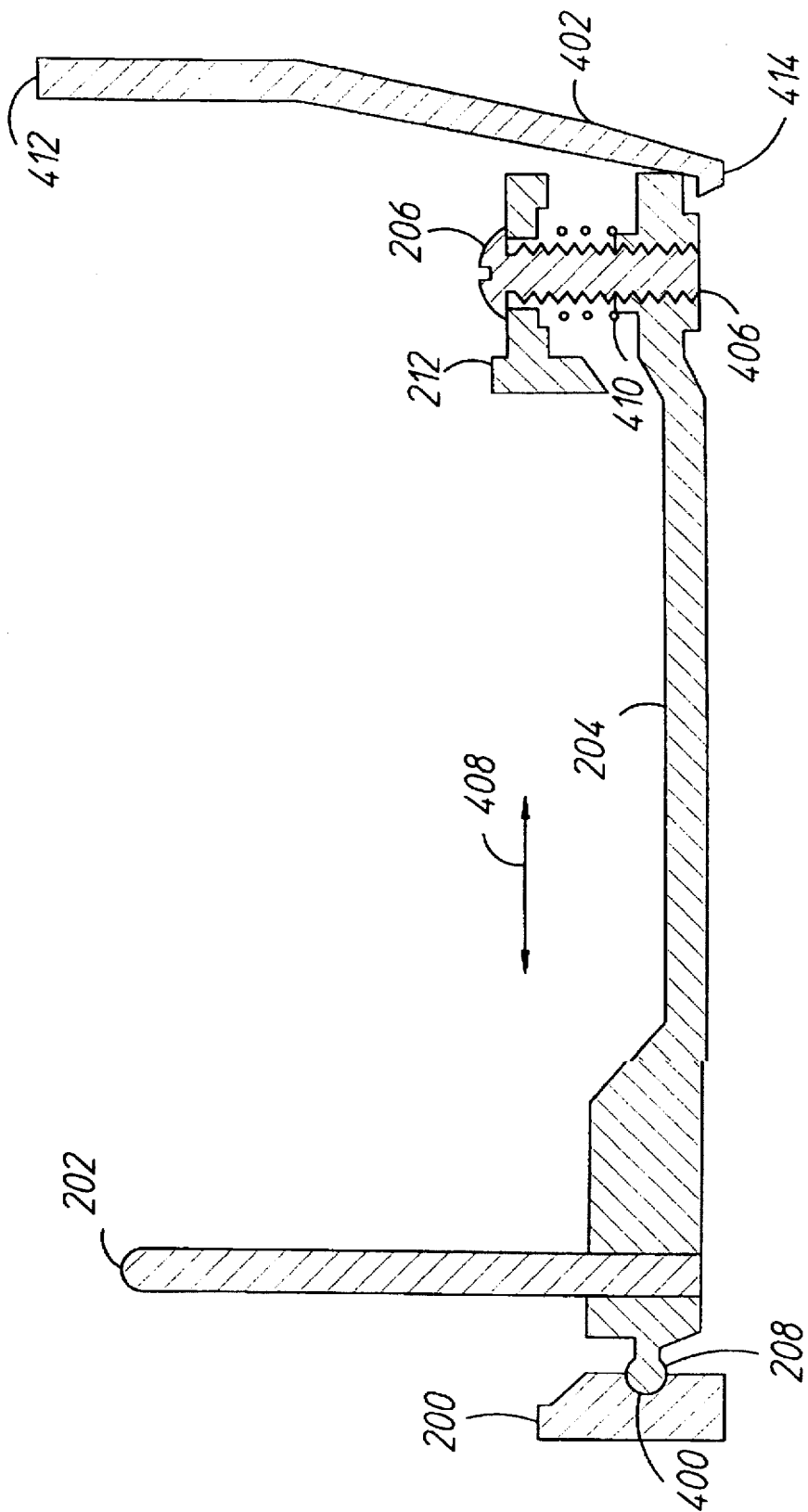
FIG. 4 is a cross section of the chassis of FIG. 2.

FIG. 4 is a simplified cross section illustrating an embodiment in which the hinge surface 208 on the plate 204 is cylindrical and mates with a matching hinge surface 400 that is a concave hinge pocket that is part of the chassis 200. The two surfaces may be reversed, with a cylindrical surface as part of the chassis and a concave hinge pocket on the end of the plate. Hinge surface 208 is free to rotate against the mating hinge surface 400. A flat spring 402 pushes the plate 204 and hinge surface 208 against the mating hinge surface 400. Spring 402 has a first end 412 that is stationary and a second end 414 that is moveable. Hinge surface 400 provides a datum or reference surface fixing the location of the base of the guide rod 202 in the horizontal direction (arrows 408). Screw 206 passes through support section 212 of the chassis 200, through a compression spring 410, and is threaded into an opening 406 in the plate 204. The end of the plate in contact with flat spring 402 is free to slip vertically on the spring 402. The compression spring 410 provides a holding force against the head of the screw 206, forcing the head of the screw against the support section 212 and holding the plate 204 away from the support section 212. Turning the screw 206 moves opening 406 and one end of the plate 204 substantially vertically, pivoting the plate 204 around hinge surface 208 (and mating hinge surface 400), adjusting the angle of the guide rod 202 and in turn adjusting the azimuth of the head (FIG. 3, 300) which is attached to the guide rod.

FIG. 4 also illustrates the simplicity of manufacturing assembly. For manufacturing, spring 410 is installed over a boss on plate 204, hinge surface 208 is held against hinge surface 400 while the opposite end of the plate 204 is forced past a small lip on the end of spring 402, and then screw 206 is installed. Preferably, screw 206 is a self tapping screw so that threads in the plate 204 are not required. Referring back to FIG. 2, note that with a self tapping screw, a torque will be applied to the plate 204 tending to rotate the plate clockwise (as viewed in FIG. 2) around the screw 206. Preferably, at least one end of the hinge is closed or blocked to prevent rotation of the hinge surfaces in the direction of screw rotation. For example, in the embodiment of FIG. 4 with a concave pocket on the chassis (FIG. 4, 400), the end of the concave pocket designated by reference number 218 in FIG. 2 is preferably closed. If the shapes of the mating hinge surfaces are reversed, with a cylindrical surface on the chassis, a corresponding block or closure is preferably placed on the appropriate end of the hinge to prevent rotation in the direction of screw rotation.

Figure 5:
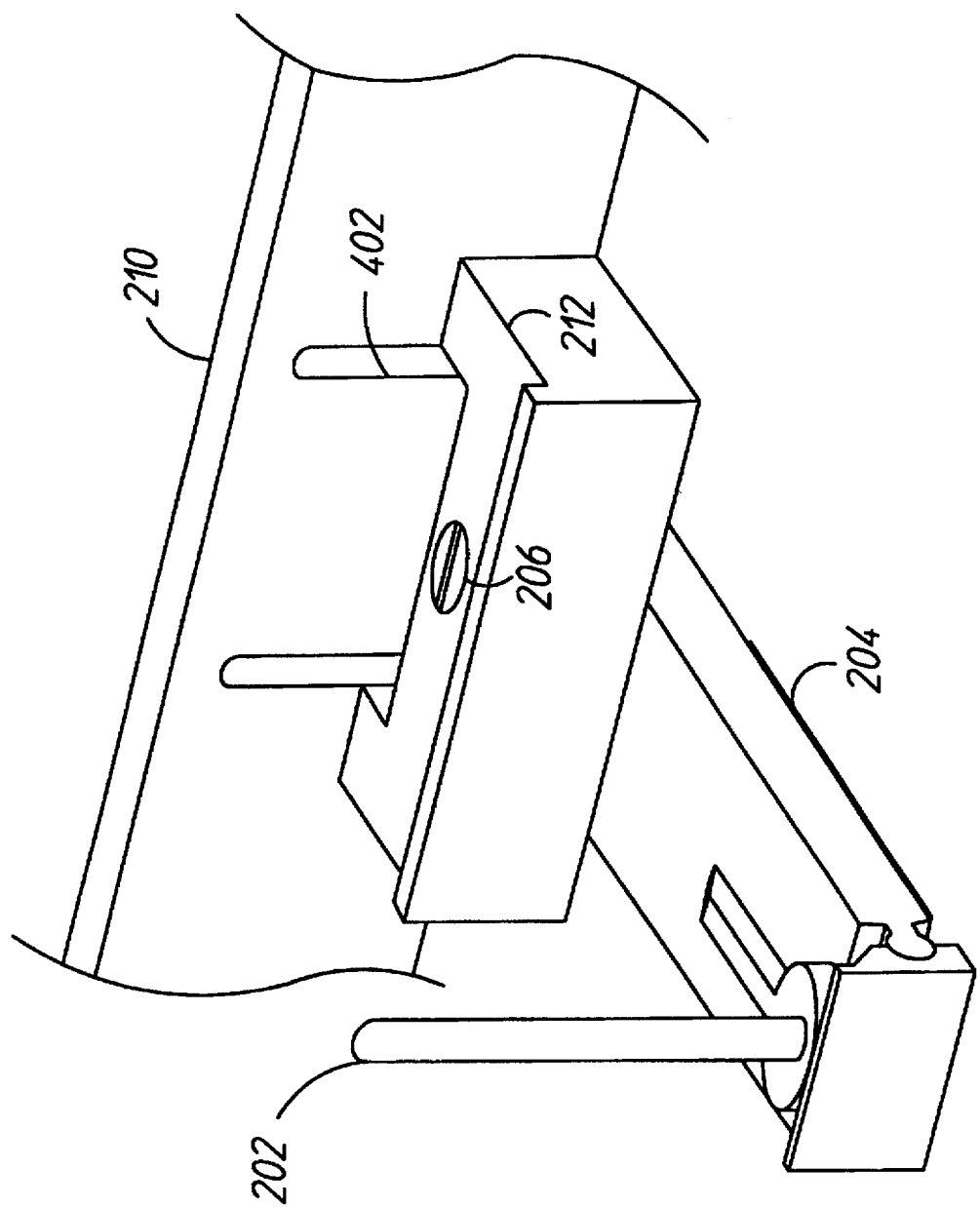
FIG. 5 is a perspective view of part of the chassis of FIG. 2.

FIG. 5 is a partial simplified perspective view, illustrating the guide rod 202, the plate 204 passing under section 212 of the chassis. FIG. 5 also illustrates a preferred embodiment of spring 402 in which the spring 402 is integral with the chassis side wall 210.

Figure 6:
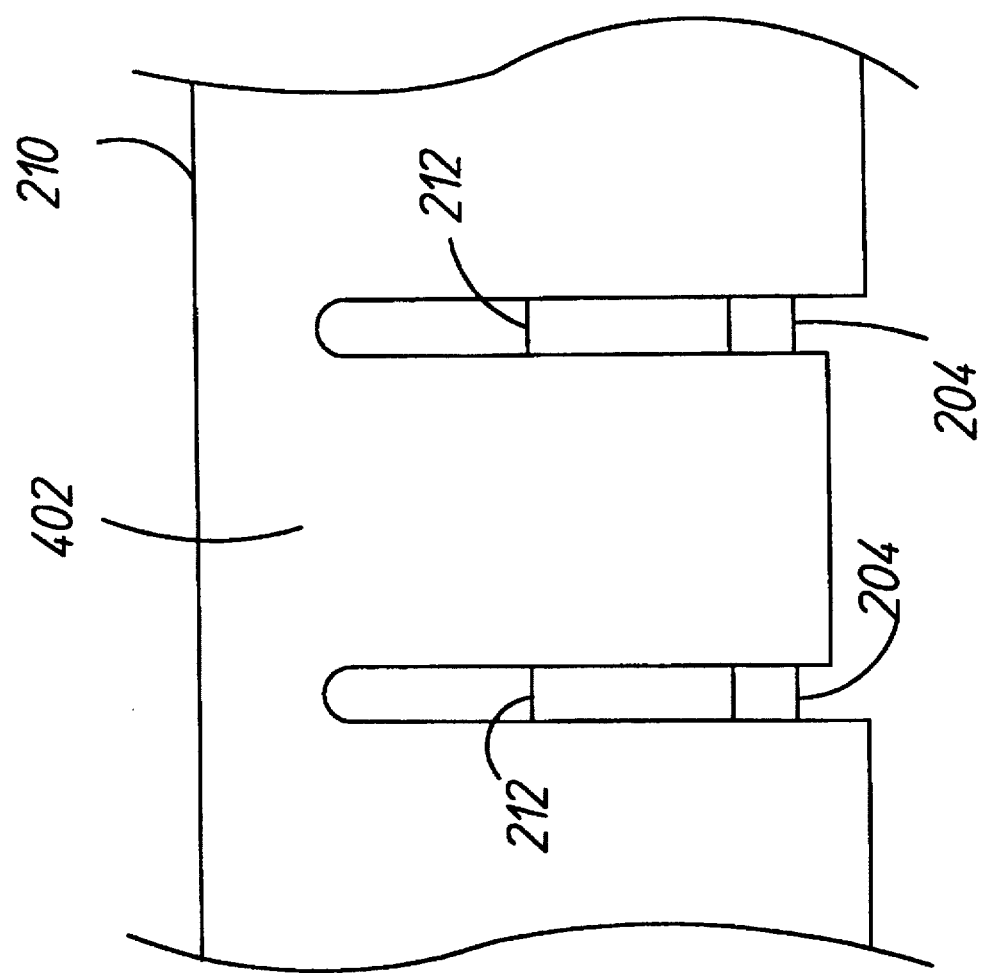
FIG. 6 is a side view of one wall of the chassis of FIG. 2.

FIG. 6 is a partial side view of the chassis side wall 210 further illustrating the preferred embodiment of spring 402. In the embodiment illustrated in FIG. 6, spring 402 is integral with the chassis wall 210, formed during the molding of the chassis. Alternatively, spring 402 could be a separate part. It could be a cantilevered flat spring as illustrated, a cantilevered wire spring, a flat or wire spring with both ends stationary and a moveable center region, or a coil spring, either compression or extension. However, for manufacturing simplicity, spring 402 is preferably made as a cantilevered integral part of the chassis side wall.

Referring back to FIGS. 3, note that when the guide rod 202 is moved, the lead screw 304 is also moved so that the mechanism driving the lead screw 304 must be able to accommodate adjustment over a small angular range of movement. There are numerous gear or belt arrangements that are not impacted by the angular movement. In the preferred embodiment, a worm gear arrangement permits some angular movement of the lead screw 304. In addition, in the preferred embodiment, a follower nut on the lead screw is sprung against the carriage rather than rigidly attached to the carriage so that some movement is permitted between the follower nut and the carriage.

Measurement of azimuth for adjustment may be made in numerous ways. One common way is to use a calibration tape having signals recorded at a range of azimuths and observing which recorded signal results in the highest amplitude voltage pulses from the head. An alternative method is to use a commercially available camera system designed especially for azimuth adjustment. The camera has split field optics. One point on a gap near the top of the head is observed with one optical field and a point on a gap near the bottom of the head is observed with the other optical field. The azimuth is adjusted until the gap lines observed in the split fields come together.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for a tape drive comprising:
   a chassis that is molded;
   a plate having first and second ends, the first end forming a first hinge surface;
   a second hinge surface molded as part of the chassis, the first hinge surface in contact with the second hinge surface permitting rotation of the first hinge surface against the second hinge surface, the first hinge surface removable from the second hinge surface along a direction from the first end of the plate toward the second end of the plate;

a magnetic head attached to the plate;

a magnetic gap in the magnetic head, the magnetic gap having an azimuth angle relative to a reference direction that is stationary; and the second end of the plate moveable in a direction that adjusts the azimuth angle of the gap.

2. The apparatus of claim 1 further comprising a spring molded as part of the chassis, the spring having a first end and a second end, the first end of the spring being stationary and the second end of the spring forcing the second end of the plate along a line from the second end of the plate toward the first end of the plate such that the first hinge surface is forced against the second hinge surface.

* * * * *